United States Patent
Hayasaka

(10) Patent No.: US 9,435,879 B2
(45) Date of Patent: Sep. 6, 2016

(54) ALERT DISPLAY DEVICE AND ALERT DISPLAY METHOD

(71) Applicant: Toyota Jidosha Kabushiki Kaisha, Toyota-shi Aichi-ken (JP)

(72) Inventor: Shoichi Hayasaka, Atsugi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/475,030

(22) Filed: Sep. 2, 2014

(65) Prior Publication Data

US 2015/0070158 A1 Mar. 12, 2015

(30) Foreign Application Priority Data

Sep. 4, 2013 (JP) ................. 2013-183181

(51) Int. Cl.
- *G01S 7/04* (2006.01)
- *G08G 1/16* (2006.01)
- *G01S 7/22* (2006.01)
- *G01S 13/93* (2006.01)

(52) U.S. Cl.
CPC .. *G01S 7/04* (2013.01); *G01S 7/22* (2013.01); *G08G 1/16* (2013.01); *G01S 13/931* (2013.01); *G08G 1/165* (2013.01); *G08G 1/166* (2013.01)

(58) Field of Classification Search
CPC ........ G08G 1/16; G08G 1/165; G08G 1/166; G01S 13/867; G01S 7/04; G02B 27/01; G02B 2027/014; G06K 9/00671

IPC .......... G08G 1/16,1/165, 1/166; G01S 13/867, G01S 7/04; G02B 7/01, 27/014; G06K 9/00671

See application file for complete search history.

(56) References Cited

U.S. PATENT DOCUMENTS

2009/0189753 A1* 7/2009 Enya ................. G02B 27/01
340/435

FOREIGN PATENT DOCUMENTS

| JP | H06-247184 A | 9/1994 |
|---|---|---|
| JP | 2011-119917 A | 6/2011 |
| JP | 2012-218505 A | 11/2012 |

* cited by examiner

*Primary Examiner* — Hongmin Fan
(74) *Attorney, Agent, or Firm* — Dinsmore & Shohl LLP

(57) ABSTRACT

Disclosed is an alert display device which highlights a display image for highlighting an object to be alerted in an actual scene in front of a driver of a vehicle or around the vehicle in a superimposing manner. The object to be alerted in front of the vehicle or around the vehicle is detected by a detection unit, and the display image for highlighting the object to be alerted in the actual scene in front of the driver of the vehicle or around the vehicle is displayed in a superimposing manner. At this time, the size of the display image is adjusted based on the position of the object to be alerted detected by the detection unit or/and a range in which the eyes of the driver are likely to be present.

10 Claims, 6 Drawing Sheets

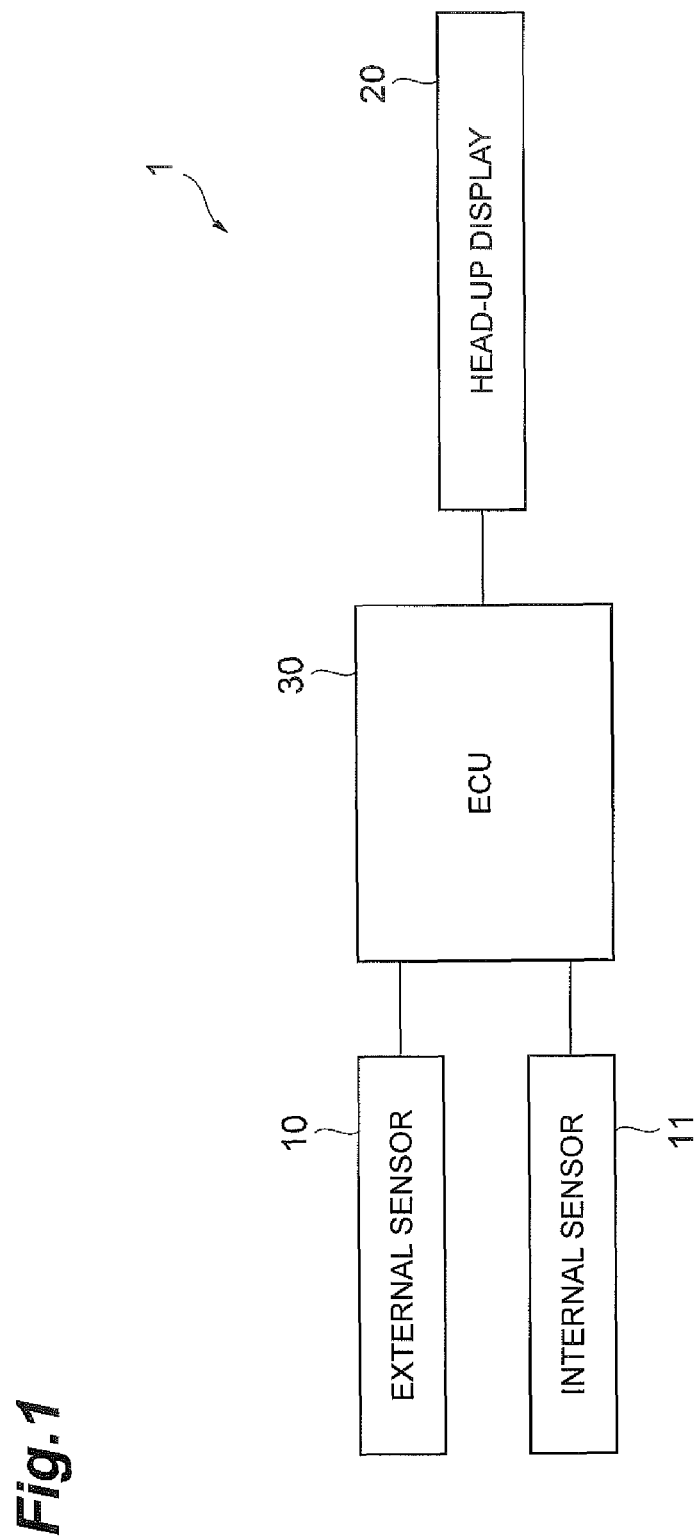

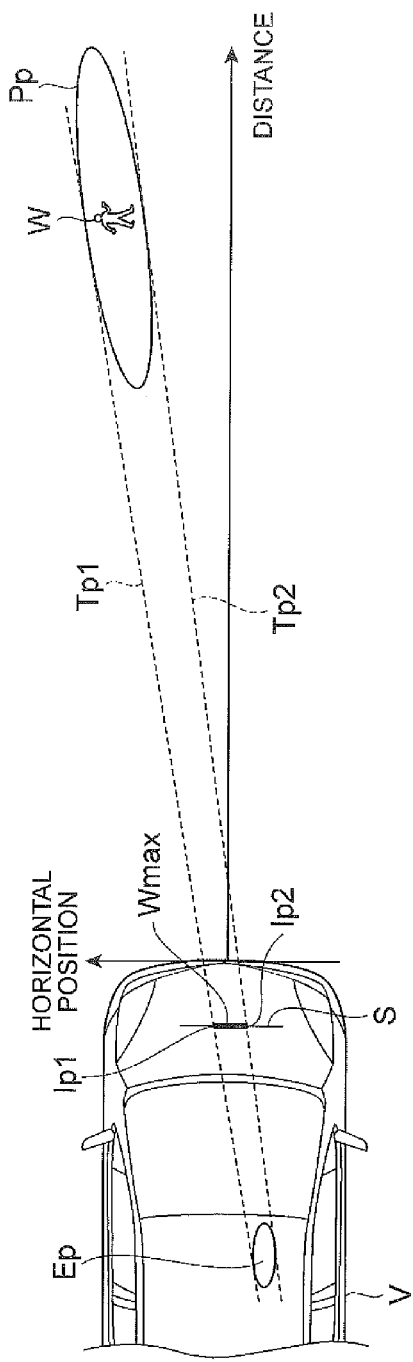
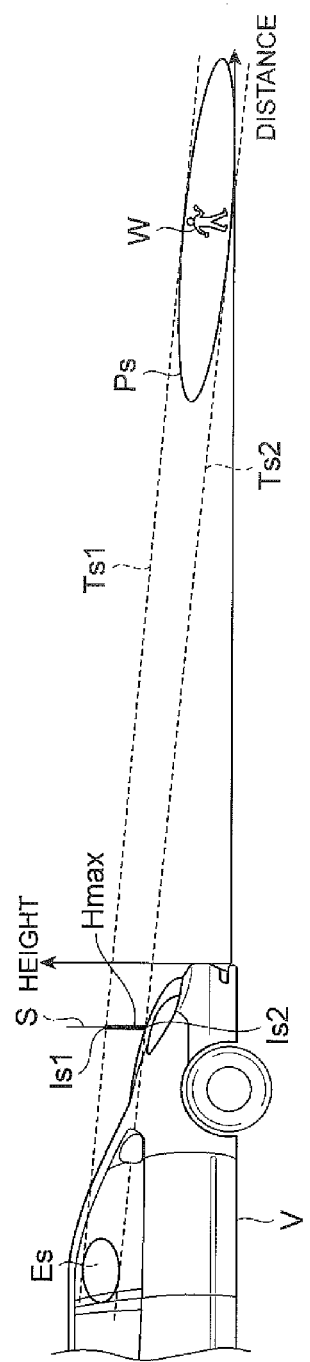
Fig. 2A
Fig. 2B

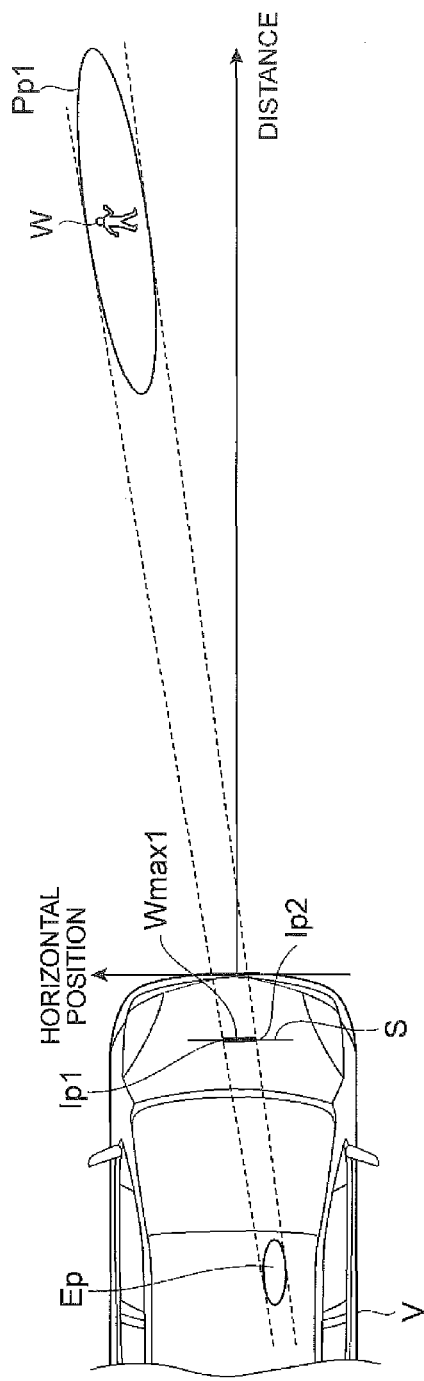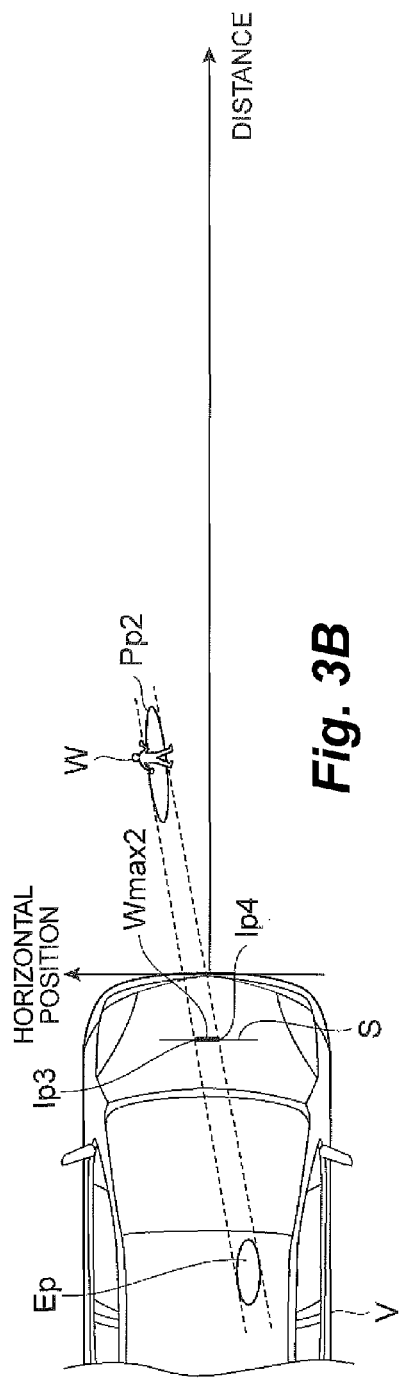

ALERT DISPLAY DEVICE AND ALERT DISPLAY METHOD

BACKGROUND OF THE INVENTION

1. Field of the Invention

The present invention relates to an alert display device and an alert display method which display a display image for highlighting an object to be alerted in an actual scene in front of a driver of a vehicle or around the vehicle in a superimposing manner.

2. Related Background Art

A variety of devices which support a driver have been developed, and of these devices, a device which provides information regarding an object to be alerted, such as a pedestrian, in front of the driver or around the driver is known. In order to inform the driver of the presence of an object to be alerted, an object to be alerted is detected using various sensors, such as a radar sensor, and the detected object to be alerted is highlighted. For example, Japanese Unexamined Patent Application Publication No. 2012-218505 describes a vehicular display device (for example, a night view device) which displays a highlight image for highlighting an object to be detected (for example, a pedestrian) in a frontward image obtained by imaging the front of a vehicle in a superimposing manner, and enlarges the size of the highlight image with respect to a reference size corresponding to size information with an increase in the traveling speed of the vehicle.

Japanese Unexamined Patent Application Publication No. 2011-119917 is another example of the related art.

As a device which highlights an object to be alerted, a head-up display (HUD) which highlights an object to be alerted in an actual scene in front of a driver or around the driver (for example, displays a frame surrounding the object to be alerted or an underscore below the object to be alerted in a superimposing manner) is known. In case of the head-up display, a frame or the like is imaged on the front side of a front glass for an actual scene which is actually viewed by the driver, instead of an image. The position of the frame or the like on the imaging surface (the position where the frame or the like is projected on the front glass) is determined from the detection position of the object to be alerted detected by the sensor. The sensor has a detection error. For this reason, if the detection position of the object to be alerted is deviated from the actual position of the object to be alerted due to the detection error, the frame or the like displayed on the imaging surface in a superimposing manner may be deviated from the object to be alerted in the actual scene. The position of the eyes of the driver changes depending on the seated height, driving posture, or the like of the driver, and the angle at which the driver looks at the object to be alerted changes depending on the position of the eyes of the driver. For this reason, the display image, such as the frame, displayed on the imaging surface in a superimposing manner may be deviated from the object to be alerted. For example, in an example shown in FIG. 6, when a pedestrian W is present as an object to be alerted on the front side, if the eyes of the driver who looks at the pedestrian W are at the position indicated by reference numeral E1, the position on an imaging surface S of the head-up display becomes the position indicated by reference numeral S1, and if the eyes of the driver who looks at the pedestrian W are at the position indicated by reference numeral E2, the position on the imaging surface S becomes the position indicated by reference numeral S2. In this way, since the angle at which the driver looks at the pedestrian W changes depending on the position of the eyes of the driver, and the position on the imaging surface S changes, the pedestrian W may protrude from the display image, such as the frame, displayed on the imaging surface S in a superimposing manner.

Accordingly, an object of the invention is to provide an alert display device and an alert display method which suppress deviation of a display image displayed on an object to be alerted in an actual scene in a superimposing manner.

According to an aspect of the invention, there is provided an alert display device which displays a display image for highlighting an object to be alerted in an actual scene in front of a driver of a vehicle or around the vehicle in a superimposing manner, the device including a detection unit configured to detect the object to be alerted in front of the vehicle or around the vehicle, a control unit configured to perform display control for positioning the display image conforming to the position of the object to be alerted detected by the detection unit, and a display unit configured to display the display image for highlighting the object to be alerted detected by the detection unit in the actual scene in front of the driver of the vehicle or around the vehicle based on the display control of the control unit, in which the control unit adjusts the size of the display image based on the position of the object to be alerted detected by the detection unit and/or a range in which the eyes of the driver are likely to be present.

In this alert display device, the object to be alerted which is in front of the vehicle or around the vehicle and to which the driver should be alerted is detected by the detection unit. In the alert display device, the display image is displayed on the display unit in a superimposing manner to highlight the object to be alerted in the actual scene in front of the driver of the vehicle or around the vehicle by the display control of the control unit. In particular, the control unit adjusts the size of the display image based on the position of the object to be alerted or the range in which the eyes of the driver are likely to be present. The detection unit has a detection error. For this reason, the position of the object to be alerted detected by the detection unit includes an error, and the range of the detection error changes depending on the position of the object to be alerted. However, the size of the display image is adjusted according to the position of the object to be alerted, whereby, even if the detection position of the object to be alerted detected by the detection unit is deviated from the actual position due to the detection error, the display image which is of size in consideration of the amount of deviation can be displayed. The position of the eyes of the driver changes depending on the seated height, driving posture, or the like of the driver. However, the size of the display image is adjusted according to the range in which the eyes of the driver are likely to be present, whereby, even if the position of the eyes of the individual driver changes, the display image which is of size in consideration of the difference in the position of the eyes can be displayed. Accordingly, even if the display position in the superimposition display is deviated from the position of the object to be alerted in the actual scene depending on the position of the object to be alerted (the detection error of the detection unit) or the position of the eyes of the driver, the object to be alerted is not significantly deviated from the display range of the display image of adjusted size, and the object to be alerted can be appropriately highlighted by the display image. In this way, the alert display device adjusts the size of the display image displayed in a superimposing manner based on the position of the object to be alerted and/or the range in which the eyes of the driver are likely to be present, whereby it is possible to suppress deviation of the display image displayed in a superimposing manner with respect to the object to be alerted in the actual scene.

The actual scene is a scene which is actually viewed from the driver in front of the vehicle or around the vehicle. The object to be alerted is an object to which the driver should pay attention when driving the vehicle among objects in the actual scene in front of the vehicle or around the vehicle, and is an object to which the driver needs to be alerted. The superimposition display is one display form of highlighting. Highlighting is display which highlights the object to be alerted in the actual scene, and displays the display image which highlights the object to be alerted. In particular, the superimposition display is display in which the display image is positioned conforming to the position of the object to be alerted in the actual scene when viewed from the driver. As the display image to be displayed in a superimposing manner, for example, a display image of a frame which is displayed to surround the object to be alerted in the actual scene, or a display image of an underscore which is displayed below the object to be alerted in the actual scene is used.

In the above-described alert display device, the control unit may adjust the size of the display image based on an error range of the detection unit according to the position of the object to be alerted detected by the detection unit. The error range of the detection unit changes depending on the position of the object to be alerted. For this reason, the error range of the detection unit according to the position of the object to be alerted is determined, and the size of the display image is adjusted based on the error range. In this way, the size of the display image is adjusted according to the error range of the detection unit, whereby, even if the detection position of the object to be alerted is deviated from the actual position due to the detection error of the detection unit, superimposition display can be performed by a display image which is of size in consideration of the amount of deviation.

In the above-described alert display device, when the position of the object to be alerted detected by the detection unit is far from the vehicle, the control unit may increase the error range of the detection unit and may increase the size of the display image compared to a case where the position of the object to be alerted is close to the vehicle. Accordingly, if the position of the object to be alerted is far from the vehicle (detection unit), while the error range of the detection unit increases, and the detection position of the object to be alerted may be significantly deviated from the actual position, superimposition display can be performed by a display image which is of size in consideration of the amount of deviation.

In the above-described alert display device of the invention, the control unit may adjust the size of the display image based on the size of the object to be alerted detected by the detection unit. Accordingly, even if the object to be alerted is a large object, superimposition display can be performed by a display image which is of size in consideration of the size of the object.

In the above-described alert display device, the display unit may be a head-up display which is mounted in the vehicle.

According to another aspect of the invention, there is provided an alert display method which displays a display image for highlighting an object to be alerted in an actual scene in front of a driver of a vehicle or around the vehicle in a superimposing manner, the method including a detection step of detecting the object to be alerted in front of the vehicle or around the vehicle, a control step of performing display control for positioning the display image conforming to the position of the object to be alerted detected in the detection step, and a display step of displaying the display image for highlighting the object to be alerted detected in the detection step in the actual scene in front of the driver of the vehicle or around the vehicle based on the display control in the control step, in which, in the control step, the size of the display image is adjusted based on the position of the object to be alerted detected in the detection step and/or a range in which the eyes of the driver are likely to be present. The alert display method acts in the same manner and has the same effects as the above-described alert display device.

According to the invention, the size of the display image displayed in a superimposing manner is adjusted based on the position of the object to be alerted or/and the range in which the eyes of the driver are likely to be present, whereby it is possible to suppress deviation of the display image displayed in a superimposing manner with respect to the object to be alerted in the actual scene.

BRIEF DESCRIPTION OF THE DRAWINGS

FIG. 1 is a configuration diagram of an alert display device according to an embodiment.

FIG. 2A is a plan view of a diagram showing the relationship among an error range of an external sensor, eyellipse, and the size of superimposition display.

FIG. 2B is a side view of a diagram showing the relationship among an error range of an external sensor, eyellipse, and the size of superimposition display.

FIG. 3A is a diagram showing the relationship between the size of an error range of an external sensor according to a pedestrian at a far position and the size of superimposition display.

FIG. 3B is a diagram showing the relationship between the size of an error range of an external sensor according to a pedestrian at a close position and the size of superimposition display.

DESCRIPTION OF THE PREFERRED EMBODIMENTS

Figure 4A:
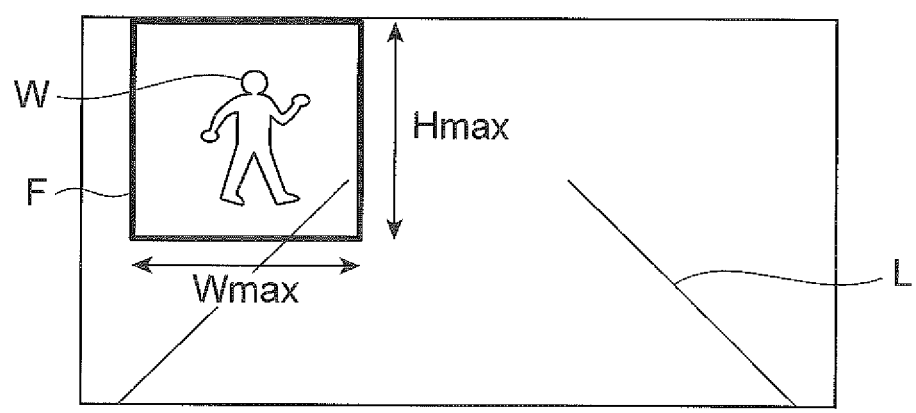
FIG. 4A shows an example of superimposition display of frame by a head-up display.

Hereinafter, an embodiment of an alert display device and an alert display method according to the invention will be described referring to the drawings. In the respective drawings, the same or similar components are represented by the same reference numerals, and overlapping description will be omitted.

In this embodiment, the invention is applied to an alert display device in which a head-up display mounted in a vehicle is used as a display unit. In the head-up display according to this embodiment, in order to allow a driver to recognize an object to be alerted, a display image for highlighting an object to be alerted in an actual scene in front of the driver is displayed (in particular, superimposition display in which the display image is positioned conforming to the object to be alerted in the actual scene when viewed from the driver). As the display image which is displayed in the superimposition display, for example, a frame surrounding the object to be alerted or an underscore below the object to be alerted is provided. As the object to be alerted, for example, a pedestrian, a bicycle, a motorcycle, and a vehicle are known. If the alert display device is used when the periphery is dark, for example, at night during which an object to be alerted, such as a pedestrian, is rarely recognized, the effect of an alert can be better exhibited. Accordingly, superimposition display may be performed by the alert display device only when the periphery is dark, for example, at night.

Figure 4B:
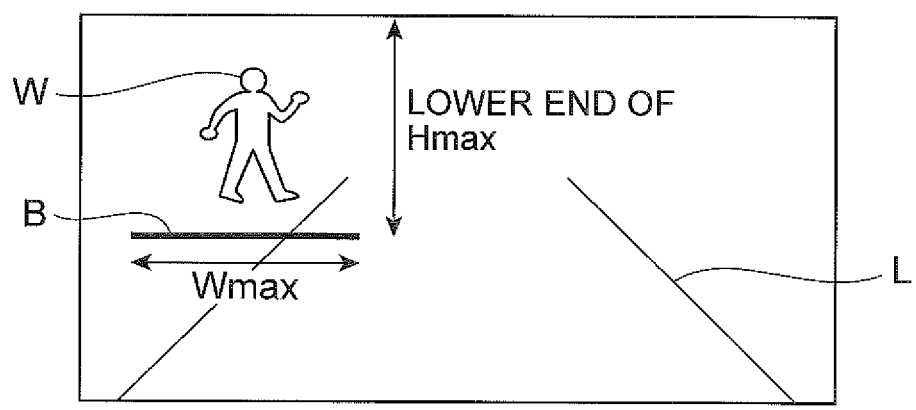
FIG. 4B shows an example of superimposition display of an underscore by a head-up display.

An alert display device 1 according to this embodiment will be described referring to FIGS. 1 to 4B. FIG. 1 is a configuration diagram of an alert display device according to this embodiment. FIGS. 2A and 2B are diagrams showing the relationship among an error range of an external sensor, eyellipse, and the size of superimposition display. FIGS. 3A and 3B are diagrams showing the relationship between an error range of an external sensor according to the position of a pedestrian and the size of superimposition display. FIGS. 4A and 4B show an example of superimposition display by a head-up display.

In this embodiment, a frame surrounding an object to be alerted and an underscore below an object to be alerted will be described as an example of superimposition display. The frame has a rectangular shape. The width of a line of the frame or underscore is set to a predetermined width such that visual attraction becomes higher. The color of the frame or underscore is set to a color in advance such that visual attraction becomes higher.

In the alert display device, the display position or size (length) of the frame or underscore as a display image displayed in a superimposing manner is calculated such that the frame or underscore can be displayed in a superimposing manner conforming to an object to be alerted in an actual scene when viewed from the driver. In particular, in the alert display device, the size of the frame or underscore is adjusted in consideration of an error range of a sensor which detects an object to be alerted or the eyellipse (a range in which the eyes are likely to be present) of the driver such that the object to be alerted in the actual scene falls within the range of the frame or underscore.

The alert display device 1 includes an external sensor 10, an internal sensor 11, a head-up display 20, and an Electronic Control Unit (ECU) 30. In this embodiment, the external sensor 10 and the ECU 30 correspond to a detection unit described in the appended claims, the ECU 30 corresponds to a control unit described in the appended claims, and the head-up display 20 corresponds to a display unit described in the appended claims.

The external sensor 10 is a sensor which detects an object (in particular, in front of) outside the vehicle. As the object to be detected, for example, a pedestrian, a bicycle, a motorcycle, and other vehicles are known. As the external sensor 10, for example, a radar sensor, such as a millimeter-wave radar, an ultrasonic radar, or a laser radar, or a camera sensor with a camera and an image processor is provided, or both or one of a radar sensor and a camera sensor may be provided. A known method in the related art is applied to the object detection by the radar sensor or the camera sensor. With the object detection by these sensors, the presence/absence of an object in a three-dimensional space is acquired, and when an object is present, the position (the relative distance from the vehicle, the direction (horizontal position), or the like), size (size in the horizontal direction, the height direction, or the like), type, and the like of the object are acquired. The external sensor 10 detects an object in front of the vehicle in each detection cycle of each sensor to acquire various kinds of information, and transmits an external information signal (information regarding the presence/absence of an object, and when an object is present, information regarding the position, size, type, and the like of each object) to the ECU 30. When a camera is used as a sensor to detect an object even if the periphery is dark, for example, at night, an infrared camera or a near infrared camera is preferably used. When a camera is used as a sensor, a stereo camera which can acquire the distance or the like by parallax is preferably used.

Each sensor of the external sensor 10 has a detection error depending on sensor performance. For example, since a radar sensor performs object detection while scanning at each predetermined scanning angle in the left-right direction, detection accuracy changes depending on the scanning angle, and detection accuracy of a horizontal position is lowered with a distance from the radar sensor. In case of a camera sensor, detection accuracy changes depending on the resolution of the camera. In case of a stereo sensor, detection accuracy changes depending on the interval of the left and right cameras. When the position is detected by these sensors, the detection error changes in error amount (error range) depending on the relative position from the sensor (in particular, relative distance), and the error amount increases with a distance from the sensor (the error range is widened). Accordingly, for each sensor which is used as the external sensor 10, the error amount (an error amount in a distance direction, an error amount in a horizontal direction (horizontal position), and an error amount in a height direction) according to the relative position from the sensor is determined in advance. Then, information regarding to the error amount according to the relative position from the sensor is stored in the ECU 30 in advance.

The internal sensor 11 is a sensor which detects information regarding the vehicle. As the internal sensor 11, for example, a GPS [Global Positioning System] sensor (however, when a navigation system is mounted, positional information is acquired from the navigation system) which detects the position of the vehicle, a vehicle speed sensor which detects vehicle speed, a yaw rate sensor which detects a yaw rate, a steering angle sensor which detects a steering angle of a steering wheel, an accelerator pedal sensor which detects an operation amount of an accelerator pedal, and a brake pedal sensor which detects an operation amount of a brake pedal are provided. The internal sensor 11 detects various kinds of information (position, vehicle speed, yaw rate, steering angle, accelerator operation amount, brake operation amount, and the like) regarding the vehicle in each detection cycle of each sensor, and transmits an internal information signal to the ECU 30.

The head-up display 20 is a device which is provided to display video (the frame in the superimposition display or the like) on a front glass to be superimposed on an actual scene. In the head-up display 20, video is projected toward the front glass, and video is reflected by the front glass toward the driver, whereby video is formed in front of the front glass to form a virtual image (corresponding to a display image).

The head-up display 20 is a known display, and the detailed configuration thereof will be omitted. If a display control signal is received from the ECU 30, the head-up display 20 acquires the display position on the front glass or information (size or the like) regarding a frame or underscore to be displayed from the display control signal, and projects a frame or an underscore of designated size at the designated display position on the front glass.

The ECU 30 is an electronic control unit which includes a Central Processing Unit (CPU), a Read Only Memory (ROM), a Random Access Memory (RAM), and the like, and performs overall control of the alert display device 1. In the ECU 30, an application program stored in the ROM is loaded on the RAM and executed by the CPU, whereby object-to-be-alerted detection processing, object-to-be-alerted information acquisition processing, error amount reading processing, detection position error range calculation processing, eyellipse reading processing, display size calculation processing, display position calculation processing, and display processing are performed. In the ECU 30, the external information signal transmitted from the external sensor 10 is received, and the internal information signal transmitted from the internal sensor 11 is received. In the ECU 30, the above-described processing is performed based on the external information signal or the internal information signal in each control cycle according to the clock frequency of the CPU, and the display control signal is transmitted to the head-up display 20 as necessary.

The object-to-be-alerted detection processing will be described. In the ECU 30, determination is performed about whether or not each object being detected is an object, to which the driver should be alerted (which endangers the traveling of the vehicle), using the external information signal from the external sensor 10, and an object which should be alerted is determined as an object to be alerted. As the determination method, for example, determination is performed about whether or not the object is moving toward a lane (road) on which the vehicle is traveling, the object is close to the lane, the object is likely to cross the lane, or the like based on the position or the moving direction of the object. At this time, a collision probability between the object and the vehicle is calculated from the position, moving direction, moving speed, or the like of the object and the position, moving direction, moving speed, and the like of the vehicle, and when the collision probability is equal to or greater than a predetermined value, the object may be determined as an object to be alerted. The moving direction or the moving speed of the object can be determined from temporal change in the position of the object. Since the vehicle and the object are moving (however, may be stopped), and thus, the positional relationship between the vehicle and the object changes temporally, it is necessary to perform the determination in each control cycle even for the same object.

The object-to-be-alerted information processing will be described. In the ECU 30, information regarding to the position, size, type, and the like of the object is extracted from the external information signal from the external sensor 10 for each object determined as an object to be alerted. Since the vehicle and the object are moving, and thus, the relative position or size of the object from the vehicle changes temporally, it is necessary to acquire information in each control cycle even for the same object.

The error amount reading processing will be described. The ECU 30 reads the error amount according to the position (in particular, relative position) of the object to be alerted from information regarding the error amount according to the relative position from the external sensor 10 (vehicle) stored in the ROM for each object determined as an object to be alerted. When a plurality of sensors are used as the external sensor 10, the error amount for a sensor used to detect the position of the object to be alerted is read. The read error amount includes an error amount in a distance direction, an error amount in a horizontal direction, and an error amount in a height direction. Since the vehicle and the object are moving, and the relative position of the object from the vehicle changes temporally, it is necessary perform the reading of the error amount in each control cycle.

The farther the position of the object to be alerted from the external sensor 10 (vehicle), the smaller the size of the object to be alerted detected by the external sensor 10. That is, the position and size of the object to be alerted detected by the external sensor 10 have a correlation. Accordingly, the error amount according to the size of the object to be alerted may be determined in advance and stored in the ECU 30 in advance, and the error amount according to the size of the object to be alerted may be read.

The detection position error range calculation processing will be described. The ECU 30 calculates the error range of the detection position of the object to be alerted using the read error amount for each object determined as an object to be alerted. The error range is, for example, an ellipsoidal three-dimensional range which has the error amount in the distance direction, the error amount in the horizontal direction, and the error amount in the height direction as the maximum values in the respective directions with the detection position of the object to be alerted detected by the external sensor 10 as a center. In regards to the error range, for example, the three-dimensional range is expressed by an ellipse Pp in plan view shown in FIG. 2A and an ellipse Ps in side view shown in FIG. 2B. Since the vehicle and the object are moving, and the relative position of the object from the vehicle changes temporally, it is necessary to perform the calculation of the detection position error range in each control cycle.

The farther the object to be alerted from the external sensor 10 (vehicle), the larger the error amount in the distance direction, the error amount in the horizontal direction, and the error amount in the height direction (however, the degree of increase is different), and the wider the error range of the detection position of the object to be alerted. FIGS. 3A and 3B show an example of the relationship between the position (in particular, a relative position) of a pedestrian W from a vehicle V and an error range (a range in plan view). As shown in FIG. 3A, when the pedestrian W is far from the vehicle V, an error range Pp1 is widened, and as shown in FIG. 3B, when the pedestrian W is close to the vehicle V, an error range Pp2 is narrowed. In this way, the detection position of the object to be alerted by the external sensor 10 includes an error, and the farther the object to be alerted from the external sensor 10 (vehicle), the wider the error range. Within this error range, the detection position of the object to be alerted detected by the external sensor 10 may be deviated from the actual position. For this reason, if the size of the frame or underscore displayed in a superimposing manner is not changed in consideration of the error range according to the position of the object to be alerted, the object to be alerted may protrude from the frame or underscore.

The eyellipse reading processing will be described. The ECU 30 reads information regarding the eyellipse stored in the ROM. For example, the eyellipse (the distribution of the position of the eyes of the driver is statistically expressed) is defined in a vehicle design stage. The eyellipse is an ellipsoidal three-dimensional range, and for example, the three-dimensional range is expressed by an ellipse Ep in plan view shown in FIG. 2A and an ellipse Es in side view shown in FIG. 2B. The eyes of the driver are present within the range of the eyellipse, and the angle at which the driver looks at an object to be alerted changes depending on the position of the eyes. For this reason, if the size of the frame or underscore displayed in a superimposing manner is not changed in consideration of the eyellipse, the object to be alerted may protrude from the frame or underscore. The eyellipse is an invariable range stored in the ROM in advance, and may be read at least once.

The display size calculation processing will be described. The ECU 30 calculates the size of the frame or underscore at the time of display on the head-up display 20 using the calculated error range of the detection position and the read eyellipse for each object determined as an object to be alerted such that the frame or underscore has the largest size in consideration of the error range and the eyellipse. In regards to the size, the length in the width direction and the length in the height direction are calculated. In case of a frame, the horizontal and vertical lengths of the rectangular frame can be defined by the length in the width direction and the length in the height direction. In case of an underscore, the length of the bar can be defined by the length in the width direction, and the display position below the object to be alerted can be defined by the length in the height direction. Since the vehicle and the object are moving, and thus, the relative position or size of the object from the vehicle changes temporally, it is necessary to perform the calculation of the size of the frame or underscore in each control cycle.

An example of the calculation method will be described referring to FIGS. 2A and 2B. As shown in FIG. 2A, two tangents Tp1 and Tp2 respectively in contact with the error range Pp of the ellipse and the eyellipse Ep of the ellipse are calculated using the error range Pp in plan view and the eyellipse Ep in plan view, and intersection points Ip1 and Ip2 between the two tangents Tp1 and Tp2 and the imaging surface S in the superimposition display on the head-up display 20 are calculated. The intersection points Ip1 and Ip2 become the left end portion and the right end portion in the width direction, and the length between the intersection points Ip1 and Ip2 becomes the length Wmax in the width direction. Similarly, as shown in FIG. 2B, two tangents Ts1 and Ts2 respectively in contact with the error range Ps of the ellipse and the eyellipse Es of the ellipse are calculated using the error range Ps in side view and the eyellipse Es in side view, and intersection points Is1 and Is2 between the two tangents Ts1 and Ts2 and the imaging surface S are calculated. The intersection points Is1 and Is2 become the upper end portion and the lower end portion in the height direction, and the length between the intersection points Is1 and Is2 becomes the length Hmax in the height direction. The positions Ip1, Ip2, Is1, and Is2 of the respective end potions or the lengths Wmax and Hmax in the respective directions are the positions or lengths on the imaging surface S in front of the front glass, and the positions Ip1, Ip2, Is1, and Is2 of the respective end portions or the lengths Wmax and Hmax in the respective directions are converted to the positions of the respective end portions or the lengths in the respective directions for projecting the frame or underscore onto the front glass.

As described above, the farther the object to be alerted from the external sensor 10 (vehicle), the wider the error range of the detection position of the object to be alerted. As shown in FIG. 3A, when the pedestrian W is far from the vehicle V, a wide error range Pp1 is set, and as shown in FIG. 3B, when the pedestrian W is close to the vehicle V, a narrow error range Pp2 is set. For this reason, when the pedestrian W is far from the vehicle V, the positions Ip1 and Ip2 of the left and right end portions on the imaging surface S are set and the length Wmax1 in the long width direction is set according to the wide error range Pp1. On the other hand, when the pedestrian W is close to the vehicle V, the positions Ip3 and Ip4 of the upper and lower end portions on the imaging surface S are set and the length Wmax2 in the short width direction is set according to the narrow error range Pp2. The same applies to the height direction. Accordingly, as the object to be alerted is far from the external sensor 10 (vehicle), the length Wmax in the width direction or the length Hmax in the height direction is extended, and the size of the frame or underscore to be displayed in a superimposing manner increases.

When calculating the size of the frame or underscore to be displayed in a superimposing manner, the size (or type) of the object to be alerted detected by the external sensor 10 may be considered, and for example, the larger the size of the object to be alerted, the larger the size of the frame or underscore. Even if objects to be alerted are at the same position, if the objects to be alerted are different in size (or are of different types), since the large object to be alerted may fall within the range of the frame or underscore, the size of the frame or underscore increases. For example, if objects to be alerted, such as a person and a bicycle, are different in size, and the size (in particular, the size in the horizontal direction) of a frame or underscore of the bicycle is not larger than the size of a frame or underscore of the person, the bicycle may not fall within the range of the frame or underscore.

The display position calculation processing will be described. The ECU 30 calculates the display position (the projection position onto the front glass) of a frame or underscore at the time of display on the head-up display 20 using the calculated positions of the respective end portions for projecting the frame or underscore onto the front glass for each object determined as an object to be alerted. In case of a frame, the center position between the position of the left end portion and the position of the right end portion is calculated as the display position in the width direction, and the center position between the position of the upper end portion and the position of the lower end portion is calculated as the display position in the height direction. In case of an underscore, the center position between the position of the left end portion and the position of the right end portion is calculated as the display position in the width direction, and the position of the lower end portion is set as the display position in the height direction as it is. Since the vehicle and the object are moving, and thus, the relative position or size of the object from the vehicle changes temporally, it is necessary to perform the calculation of the display position of the frame or underscore in each control cycle.

The display processing will be described. The ECU 30 generates a display control signal for each object determined as an object to be alerted and transmits the display control signal to the head-up display 20. The display control signal includes information regarding the calculated size and position of the frame or underscore at the time of display on the head-up display 20. The ECU 30 transmits the display control signal to the head-up display 20 until it is determined that an object is not an object to be alerted. Since the display position or size is calculated in each control cycle, it is necessary to generate the display control signal again in each control cycle accordingly.

In an example shown in FIGS. 4A and 4B, a pedestrian W is detected as an object to be alerted, a vehicle is traveling on a lane (road) L, and superimposition display for alerting the pedestrian W approaching the lane L is performed. FIG. 4A shows superimposition display by a frame. A rectangular frame F which has the length Wmax in the width direction and the length Hmax in the height direction with the center position between the right and left end portions as a center is imaged, and the pedestrian W viewed by the driver falls within the frame F. FIG. 4B shows superimposition display by an underscore. An underscore B which has the length Wmax in the width direction with the center position between the right and left end portions and the position of the lower end portion as a center is imaged, and the pedestrian W viewed by the driver falls within the range of the underscore B.

Figure 5:
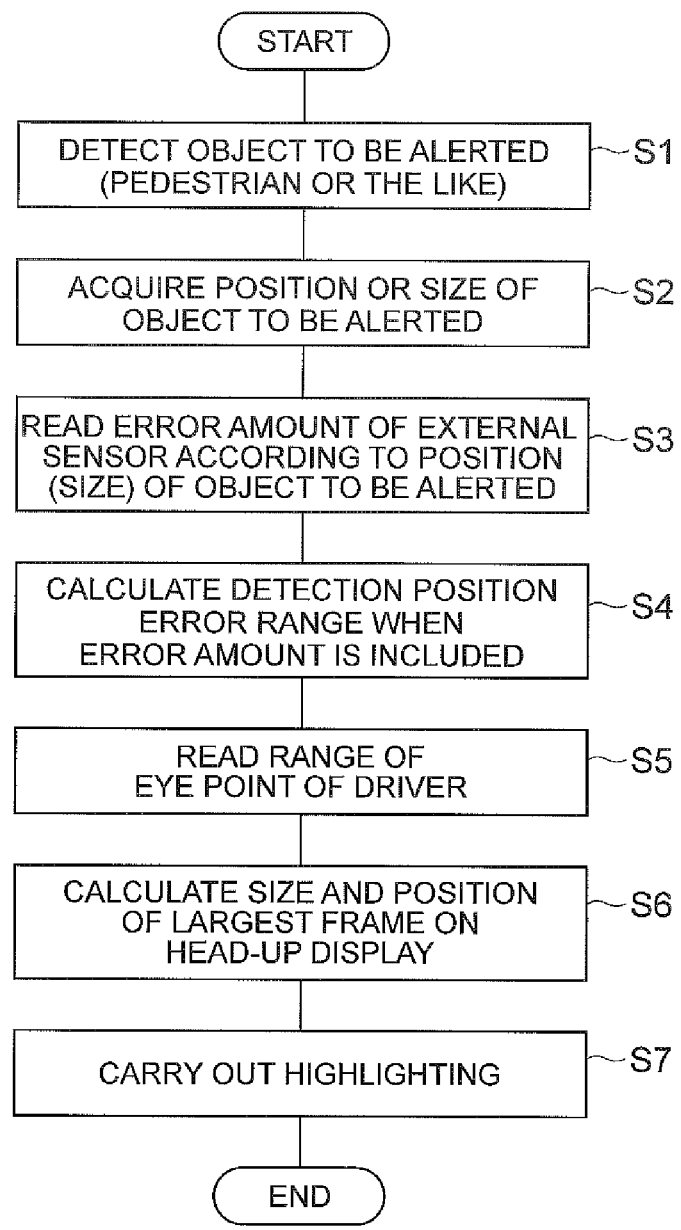
FIG. 5 is a flowchart showing the flow of alert display according to an embodiment.
Figure 6:
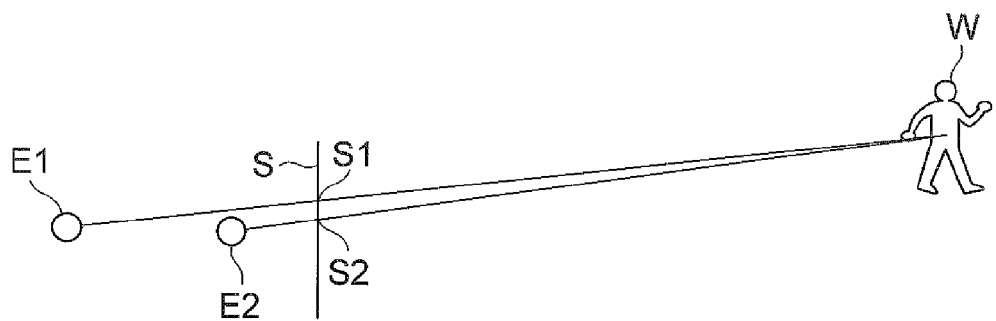
FIG. 6 is a diagram schematically showing change in position on an imaging surface of a head-up display depending on the position of the eyes of a driver.

The flow of the operation of the alert display device 1 having the above-described configuration will be described referring to the flowchart of FIG. 5. FIG. 5 is a flowchart showing the flow of alert display according to this embodiment. In the description of the operation, a case where a frame is displayed in a superimposing manner will be described.

The external sensor 10 detects an object in front of the vehicle in each detection cycle, when an object can be detected, acquires information regarding the position, size, type, and the like of the object, and transmits information as an external information signal to the ECU 30. The ECU 30 receives the external information signal and temporarily stores information included in the external information signal. The internal sensor 11 detects the position, speed, yaw rate, steering angle, accelerator operation amount, brake operation amount, and the like of the vehicle in each detection cycle, and transmits the detected information as an internal information signal to the ECU 30. The ECU 30 receives the internal information signal and temporarily stores information included in the internal information signal.

The ECU 30 performs determination about whether or not each object being detected is an object, to which the driver should be alerted, based on information included in the external information signal in each control cycle, and detects an object, which should be alerted, as an object to be alerted (S1). S1 corresponds to a detection step in the appended claims. The ECU 30 acquires information regarding the position, size, type, and the like of the object to be alerted based on information included in the external information signal for the detected object to be alerted (S2).

The ECU 30 reads the error amount of the external sensor 10 according to the position of the object to be alerted from information stored in advance in the ROM for each detected object to be alerted in each control cycle (S3), and calculates the error range of the detection position of the object to be alerted using the error amount (S4). The ECU 30 reads the range (eyellipse) of the eye point of the driver from information stored in advance in the ROM (S5).

The ECU 30 calculates the size and display position of the frame, which becomes largest on the head-up display 20, based on the error range of the detection position of the object to be alerted and the eyellipse for each detected object to be alerted in each control cycle (S6). Then, the ECU 30 generates a display control signal for displaying the frame of the size at the display position in a superimposing manner for each detected object to be alerted in each control cycle and transmits the display control signal to the head-up display 20 (S7). If the display control signal is received, the head-up display 20 projects video of the frame of the size represented by the display control signal onto the front glass at the display position represented by the display control signal (S7). If the projected frame is reflected by the front glass toward the driver, the frame surrounding the object to be alerted is imaged in front of the front glass, and the object to be alerted is highlighted by the frame.

In particular, the frame is the frame in consideration of the error range of the detection position of the object to be alerted and the eyellipse, and the object to be alerted is extremely unlikely to protrude from the frame. Accordingly, if the driver keeps the eyes fixed to the frame instantaneously, the driver moves the eyes toward the frame and notices the occurrence of an alert. The driver who faces the frame focuses on the object to be alerted in the frame and recognizes the object to be alerted. S7 corresponds to a display step described in the appended claims, and S3 to S7 correspond a control step described in the appended claims.

If an object which has been detected as an object to be alerted is not detected as an object to be alerted, the ECU 30 stops the transmission of the display control signal for the object to be alerted. Accordingly, the head-up display 20 stops the projection of video of the frame surrounding the object to be alerted.

According to this alert display device 1, the size of the display image (frame or underscore) displayed in a superimposing display is adjusted based on the error range of the external sensor 10 according to the position of the object to be alerted and the range (eyellipse) in which the eyes of the driver are likely to be present, whereby it is possible to suppress deviation of the display image displayed in a superimposing manner with respect to the object to be alerted in the actual scene. As a result, the object to be alerted does not protrude from the display range of the display image, and the driver easily finds the object to be alerted. The display image is not displayed outside the object to be alerted, and an erroneous object is not alerted and noticed to the driver.

Incidentally, since the external sensor 10 has a detection error, the position of the object to be alerted detected by the external sensor 10 includes an error, and the range of the detection error changes depending on the position of the object to be alerted. However, in the alert display device 1, as the error range according to the position of the object to be alerted becomes larger, the size of the display image increases, whereby, even if the detection position of the object to be alerted detected by the external sensor 10 is deviated from the actual position due to the detection error, superimposition display can be performed by a display image which is of size enough to cover the amount of deviation. The position of the eyes of the driver changes depending on the seated height, driving posture, or the like of the driver. However, in the alert display device 1, the size of the display image increases according to the eyellipse, whereby, even if the position of the eyes of the individual driver changes, superimposition display can be performed by a display image which is of size enough to cover the difference in the position of the eyes.

Although the embodiment of the invention has been described, the invention is not limited to the above-described embodiment and may be carried out in various forms.

For example, in this embodiment, although the invention is applied to a head-up display which is mounted in a vehicle, the invention may be applied to other display devices. For example, the invention may be applied to a display device which is brought in the vehicle from the outside. In this embodiment, although a configuration in which an object to be alerted in an actual scene in front of a vehicle is highlighted has been made, a configuration in which an object to be alerted in an actual scene around the vehicle, such as a rear side or a lateral side, is highlighted may be made.

In this embodiment, although an example of a frame surrounding an object to be alerted or an underscore below an object to be alerted has been described as a display image in superimposition display, other display images may be used.

In this embodiment, although the eyellipse defined in the design stage has been applied as the range in which the eyes of the driver are likely to be present, the eyes of the driver may be detected using a camera sensor or the like, and a range in which the eyes of the driver are likely to be present may be set to have the error range of the sensor used for detection with the detected position of the eyes as a center.

In this embodiment, although a configuration in which the size of the frame or underscore in the superimposition display is set using both the error range of the sensor according to the position of the object to be alerted and the range (eyellipse) in which the eyes of the driver are present has been described, the size of the frame or underscore in the superimposition display may be set using either the error range of the sensor according to the position of the object to be alerted or the range in which the eyes of the driver are present.

In this embodiment, although a configuration in which the error range of the sensor according to the position of the object to be alerted is determined and the size of the frame or underscore in the superimposition display is set using the error range of the sensor has been described, the size of the frame or underscore in the superimposition display may be set directly from the position of the object to be alerted.

What is claimed is:

1. An alert display device which displays a display image for highlighting an object to be alerted in an actual scene in front of a driver of a vehicle or around the vehicle in a superimposing manner, the device comprising:
    a detection unit configured to detect the object to be alerted in front of the vehicle or around the vehicle and to detect a position of the object to be alerted;
    a control unit configured to perform display control for positioning the display image conforming to the position of the object to be alerted detected by the detection unit; and
    a display unit configured to display the display image for highlighting the object to be alerted detected by the detection unit in the actual scene in front of the driver of the vehicle or around the vehicle in the superimposing manner based on the display control of the control unit,
    wherein the control unit adjusts a size of the display image based on an error range of the detection unit according to the position of the object to be alerted detected by the detection unit and/or a range in which the eyes of the driver are likely to be present.

2. The alert display device according to claim 1,
    wherein, the error range and the size of the display image are larger when the position of the object to be alerted is at a first location than when the position of the object to be alerted is at a second location, wherein the first location is farther from the vehicle than the second location.

3. The alert display device according to claim 1,
    wherein the control unit adjusts the size of the display image based on an object size of the object to be alerted detected by the detection unit.

4. The alert display device according to claim 1,
    wherein the display unit is a head-up display which is mounted in the vehicle.

5. An alert display method which displays a display image for highlighting an object to be alerted in an actual scene in front of a driver of a vehicle or around the vehicle in a superimposing manner, the method comprising:
    a detection step of detecting the object to be alerted in front of the vehicle or around the vehicle and detecting a position of the object to be alerted;
    a control step of performing display control for positioning the display image conforming to the position of the object to be alerted detected in the detection step; and
    a display step of displaying the display image for highlighting the object to be alerted detected in the detection step in the actual scene in front of the driver of the vehicle or around the vehicle in the superimposing manner based on the display control in the control step,
    wherein, in the control step, a size of the display image is adjusted based on an error range of a detection unit according to the position of the object to be alerted detected in the detection step and/or a range in which the eyes of the driver are likely to be present.

6. The alert display method of claim 5, further comprising:
    determining an object size of the object to be alerted; and
    determining the error range of the detection unit based on the object size.

7. An alert display device for displaying a display image on a display such that the display image highlights an object to be alerted, the alert display device comprising:
    an external sensor outputting an external information signal;
    the display; and
    a processor and a non-transitory memory module, wherein the non-transitory memory module comprises a set of machine readable instructions that, when executed by the processor:
        detect the object to be alerted based on the external information signal;
        determine a position of the object to be alerted;
        determine an error range of the external sensor based on the position of the object to be alerted;
        determine a size of the display image based on the error range of the external sensor; and
        display the display image on the display such that the display image highlights the object to be alerted.

8. The alert display device according to claim 7, wherein, the error range and the size of the display image are larger when a position of the object to be alerted is at a first location than when the position of the object to be alerted is at a second location, wherein the first location is farther from the vehicle than the second location.

9. The alert display device according to claim 7, wherein, when executed by the processor, the machine readable instructions:
    determine an object size of the object to be alerted; and
    determine the size of the display image based on the object size.

10. The alert display device according to claim 7,
    wherein the display is a head-up display which is mounted in a vehicle.

* * * * *